US009366771B2

(12) United States Patent
Dasgupta et al.

(10) Patent No.: US 9,366,771 B2
(45) Date of Patent: Jun. 14, 2016

(54) SYSTEM AND METHOD FOR MIGRATION VELOCITY MODELING

(75) Inventors: Saptarshi Dasgupta, Houston, TX (US);
Norman Ross Hill, Houston, TX (US);
Daniel P. Johnson, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 748 days.

(21) Appl. No.: 13/558,611

(22) Filed: Jul. 26, 2012

(65) Prior Publication Data

US 2014/0029383 A1 Jan. 30, 2014

(51) Int. Cl.
*G01V 1/36* (2006.01)
*G01V 1/30* (2006.01)

(52) U.S. Cl.
CPC ................................ *G01V 1/303* (2013.01)

(58) Field of Classification Search
CPC ...................................................... G01V 1/303
USPC .......................................................... 367/73
See application file for complete search history.

(56) References Cited

U.S. PATENT DOCUMENTS

| | | | | |
|---|---|---|---|---|
| 3,638,178 A * | 1/1972 | Stephenson | | 367/71 |
| 6,070,125 A | 5/2000 | Murphy et al. | | |
| 6,502,037 B1 * | 12/2002 | Jorgensen et al. | | 702/14 |
| 7,184,991 B1 | 2/2007 | Wentland et al. | | |
| 7,355,923 B2 | 4/2008 | Reshef et al. | | |
| 7,480,206 B2 | 1/2009 | Hill | | |
| 7,493,241 B2 | 2/2009 | Lee | | |
| 7,756,642 B2 | 7/2010 | Abubakar et al. | | |
| 7,797,110 B2 | 9/2010 | Shin | | |
| 7,805,250 B2 | 9/2010 | Colombo et al. | | |
| 8,743,115 B1 * | 6/2014 | Mallet et al. | | 345/424 |
| 2008/0273421 A1 * | 11/2008 | Koren | | G01V 1/301 367/11 |
| 2009/0257308 A1 | 10/2009 | Bevc et al. | | |
| 2009/0290451 A1 | 11/2009 | Banik | | |
| 2010/0305863 A1 | 12/2010 | Abubakar et al. | | |
| 2011/0096627 A1 * | 4/2011 | Hill | | 367/73 |
| 2012/0029827 A1 | 2/2012 | Pepper et al. | | |

OTHER PUBLICATIONS

K. P Bube and R. T. Langan, 1997, Hybrid L1/L2 minimization with applications to tomography, Geophysics, vol. 62, pp. 1183-1195.
G. E. Murphy and S. H. Gray, 1999, Manual seismic reflection tomography, Geophysics,vol. 64, pp. 1546-1553.
I. F. Jones, 2003, A Review of 3D PerSDM Model Building Techniques, First Break, vol. 21.

* cited by examiner

*Primary Examiner* — Daniel L Murphy
(74) *Attorney, Agent, or Firm* — Robert Perez; Marie L. Clapp (57) ABSTRACT

A method of modifying a seismic image of a subsurface region includes identifying a location within the seismic image that includes a distortion, indicating a structural change associated with the distortion, that is selected to at least partially correct for the distortion, identifying a region causing the distortion in which corrections to a velocity model corresponding to the seismic image are to be applied, performing an inversion for the region in accordance with the indicated structural change, updating the velocity model on the basis of the inversion, and producing a modified seismic image on the basis of the updated velocity model.

11 Claims, 11 Drawing Sheets

SYSTEM AND METHOD FOR MIGRATION VELOCITY MODELING

BACKGROUND

1. Field

The present invention relates generally to seismic imaging and more particularly to velocity model correction.

2. Background

Seismic surveying is used to characterize subsurface formations and in particular for locating and characterizing potential hydrocarbon reservoirs. One or more seismic sources at the surface generate seismic signals that propagate through the subsurface, reflect from subsurface features, and are collected by sensors. Raw data is generally in the form of travel times and amplitudes, which must be processed in order to obtain information about the structure of the subsurface.

Typically, processing includes inversion of the collected time information to produce a velocity model of the subsurface structure. Because there are usually multiple velocity solutions that satisfactorily explain any given set of time data, it is not always known whether the velocity models accurately depict the subsurface structure. In this regard, even the most geophysically advanced techniques for inverting seismic data may result in velocity models that, when used as the basis of subsurface imaging techniques, produce geologically implausible seismic images. For example, a seismic image might show crossing beds, which cannot represent the real geological structure. Also, there may be reflection events that are believed to have simple structure but are not simple in a seismic image. This often occurs for reflection events in fault shadows and for basement reflection events where they are beneath a complex overburden.

Geophysical inversion techniques that rely on flattening image gathers often cannot correct the image. In noisy conditions and complex geology, it can be hard to see events on the prestack gathers, and, even if the events can be seen, it is sometimes hard to modify the velocity model so that they become flat. Moreover, even if velocity model changes lead to flat gathers, the image can still turn out to be implausible because a range of velocity models often will flatten the gathers but produce significantly different structure in the image.

SUMMARY

An aspect of an embodiment of the present invention includes a method of modifying a seismic image of a subsurface region includes identifying a location within the seismic image that includes a distortion, indicating a structural change associated with the distortion, that is selected to at least partially correct for the distortion, identifying a region causing the distortion in which corrections to a velocity model corresponding to the seismic image are to be applied, performing an inversion for the region in accordance with the indicated structural change, updating the velocity model on the basis of the inversion, and producing a modified seismic image on the basis of the updated velocity model.

An aspect of an embodiment may include a system for performing any of the foregoing methods.

An aspect of an embodiment of the present invention includes a system including a graphical user interface, a data storage device and a processor, the processor being configured to perform the foregoing method.

Aspects of embodiments of the present invention include computer readable media encoded with computer executable instructions for performing any of the foregoing methods and/or for controlling any of the foregoing systems.

DESCRIPTION OF THE DRAWINGS

Other features described herein will be more readily apparent to those skilled in the art when reading the following detailed description in connection with the accompanying drawings, wherein.

DETAILED DESCRIPTION

In accordance with an embodiment of the present invention, a method for inverting seismic data includes providing information regarding an expected geological structure, and inverting that structure to determine what velocity models would produce the given structure. As will be appreciated, velocity models in this context may be isotropic or anisotropic, depending, for example, on the geology of the region under study or on simplifying assumptions made in the modeling. In general, such modeling is performed on a computing system including a processor, a graphical user interface, and a data storage device.

After completing the inversion, gathers are checked for flatness. Along with the interpretive input that delineates the expected structure, regions are identified where there is reason to believe that velocities might be incorrect and therefore eligible for change during the inversion.

Figure 1:
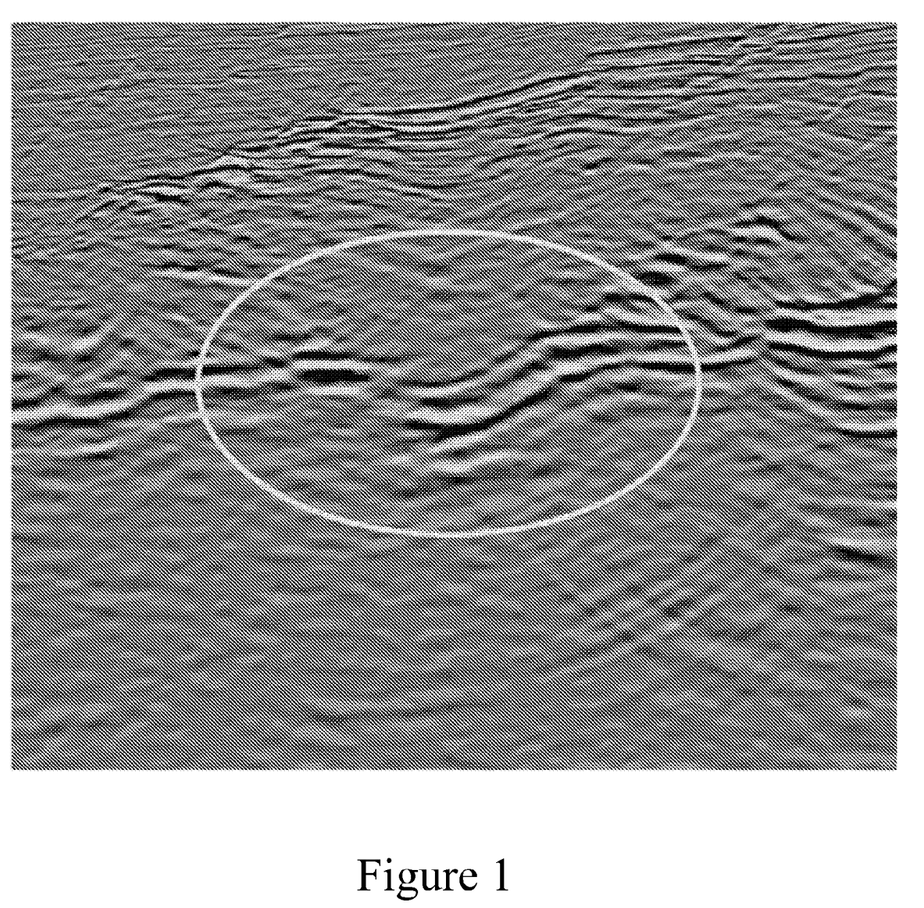
FIG. 1 is a seismic image illustrating an anomalous region.

FIG. 1 is an example of a seismic image to be displayed that includes an apparently anomalous feature. Specifically, there is a depressed region indicated by the white oval that does not appear to be a geologically likely. Typically, an expert interpreter would tend to believe that the reflection should be smoother and flatter.

Thus, this region of the image would appear to be an artifact that may be caused, for example, by an incorrect velocity model. Specifically in this case, it appears that a portion of the overburden has been assumed to have higher velocities than are actually present (resulting in the greater imaged depths for this portion of the structure). In a particular example, the interpreter may know or expect that some portion of the overburden should be heterogeneous, or might be aware that the uncertainty of the velocities in this region are highly uncertain for some reason.

Figure 2:
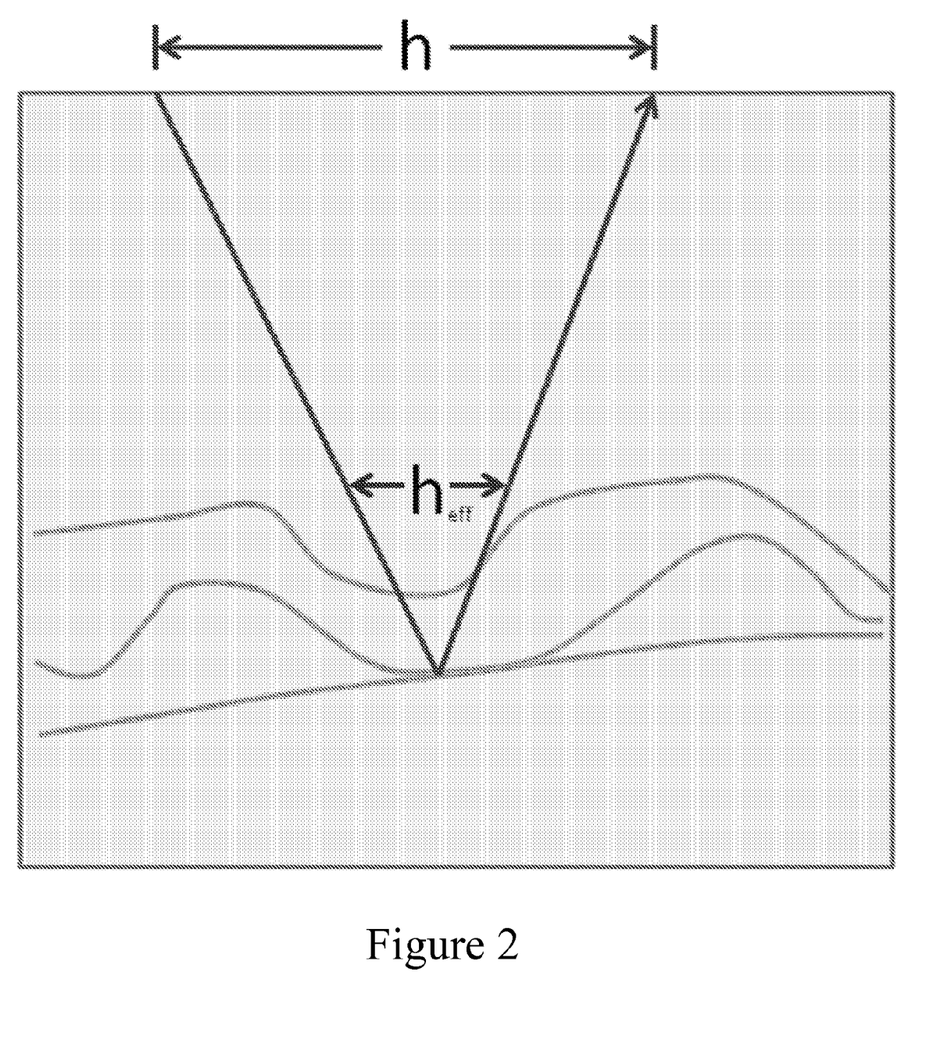
FIG. 2 is a schematic illustration of a seismic image having an anomalous region and illustrating a small effective offset available for correction of the anomaly.

In some cases, it may be difficult to improve the velocity modeling in this difficult region. For example, in a region for which there is limited effective offset and no deeper events to use for velocity correction (as depicted in FIG. 2), conventional gather flattening approaches may not be able to provide sufficient basis for correction.

Figure 3:
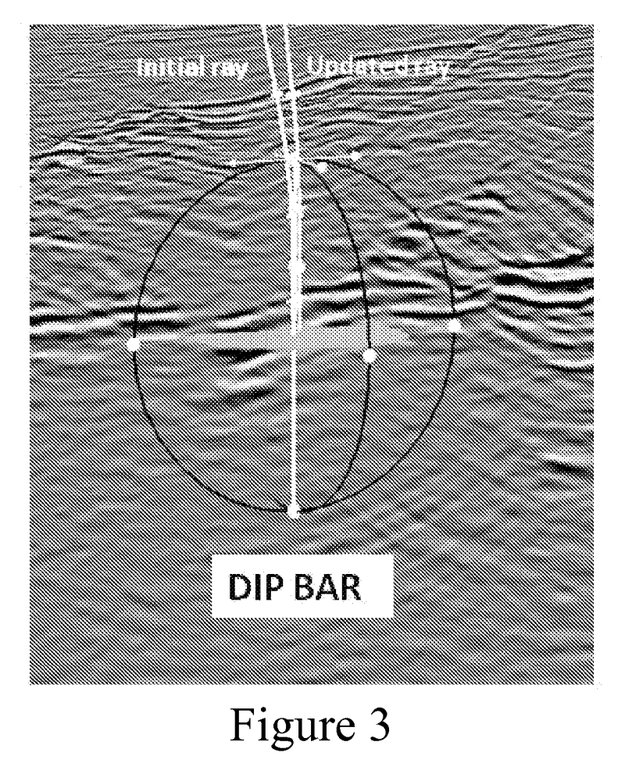
FIG. 3 is a seismic image having a three dimensional dip bar positioned to locate a portion of the distortion in accordance with an embodiment of the invention.

In a method in accordance with an embodiment of the invention, characteristics (e.g., location, dip) of an erroneous structure, or a structure perceived to be erroneous, are identified. In an embodiment, the identification is made by using interactive 3D graphics to place markers, for example, disks, at the location and dip of the structure in question as shown in FIG. 3. In principle, the marker may be similar to or the same as what is known to those in the art as a dip-bar, a name that is retained from 2D seismic work, for which location and dip can be represented by a simple line segment or bar.

Figure 4:
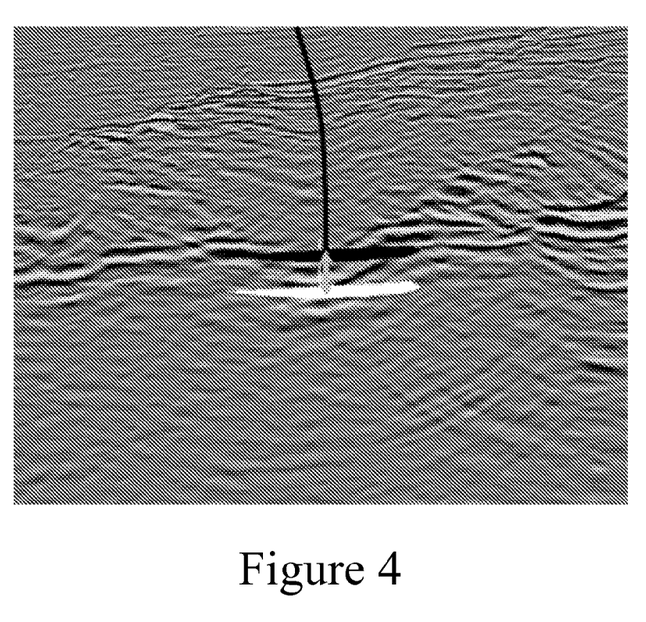
FIG. 4 is a seismic image illustrating a selected position correction for the dip bar of FIG. 3, selected to correct for the image distortion.
Figure 5:
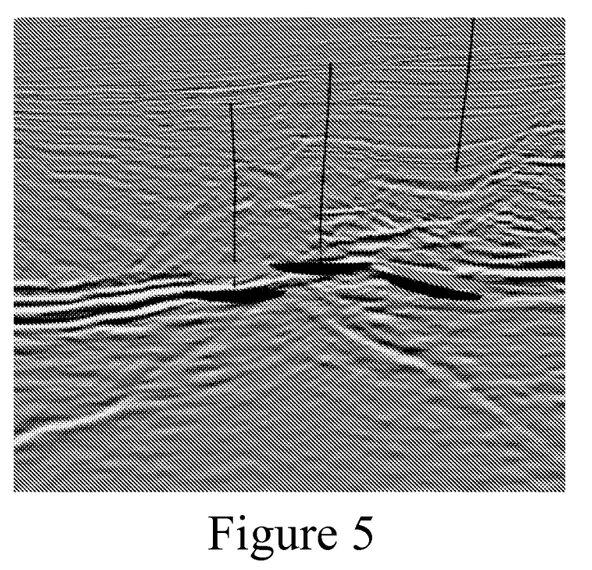
FIG. 5 is the image of FIGS. 3 and 4 having several dip bars and respective position correction, selected to correct for the image anomaly.

The method may be useful, for example, in a seismic ray-tracing migration method (for example a Gaussian-beam migration method as described, for example in U.S. Pat. No. 5,274,605, incorporated by reference herein). It may also find application in other migrations, including, for example, Kirchhoff, RTM and others. In accordance with such a ray-tracing embodiment, a normal ray from the center of the disk is plotted, directed upward to the earth's surface. Once a disk is placed on a currently imaged event, the next step is to identify what the correct structural position of this event is believed to be. The identification of this corrected position is made by specifying a shift along the normal ray as illustrated by the arrow in FIG. 4. The designation of dip bars and their respective shifts and normal rays is repeated over the structure until the entire structure is defined as shown in FIG. 5.

For a given set of dip bars and their associated structural changes, there are generally a large number of potential velocity fields that could be responsible. The seismic rays generated by the dip bar placement may be nearly parallel, implying that there is little resolution for corrections along the normal direction (along the rays). Therefore, an interpretive step is optionally included to provide additional resolution in this direction.

Just as the interpreter usually has a notion of what the correct geological structure should be, he or she usually has an idea of where the velocities are most uncertain and therefore most likely in need of update. For example, where the problematic structure is the result of shadowing by a fault, an experienced interpreter will tend to understand that the velocity field has large uncertainty near the fault.

In this example, uncertainty may result, in part due to contrasts in bedding across the fault or because of gas trapped near the fault, either one of which causes a lack of uniformity of velocities in the region. Such velocity heterogeneity near the fault is often beyond the capabilities of conventional velocity analysis methods and generally remains uncertain when the interpreter is trying to resolve fault shadows. Therefore, it is reasonable in the case of the fault shadow to provide the needed resolution by limiting the velocity updates to the region near the fault.

As will be appreciated, there are a variety of structures that an interpreter may identify as likely to result in uncertainties from which spatial resolution for velocity changes may be derived. By way of non-limiting example, such uncertainty-producing structures include: gas pods, allochthonous sediment layers near allochthonous salt, salt inclusions of anhydrites or sediments, complex salt-sediment interfaces and rocks near sea-floor canyons. In these and many other cases, the interpreter can identify the regions of velocity uncertainty on an existing image but does not know what the magnitude of the corrections should be.

In accordance with an embodiment of the invention, the uncertain magnitudes may be provided by performing an inversion on the dip bar shifts.

Figure 6:
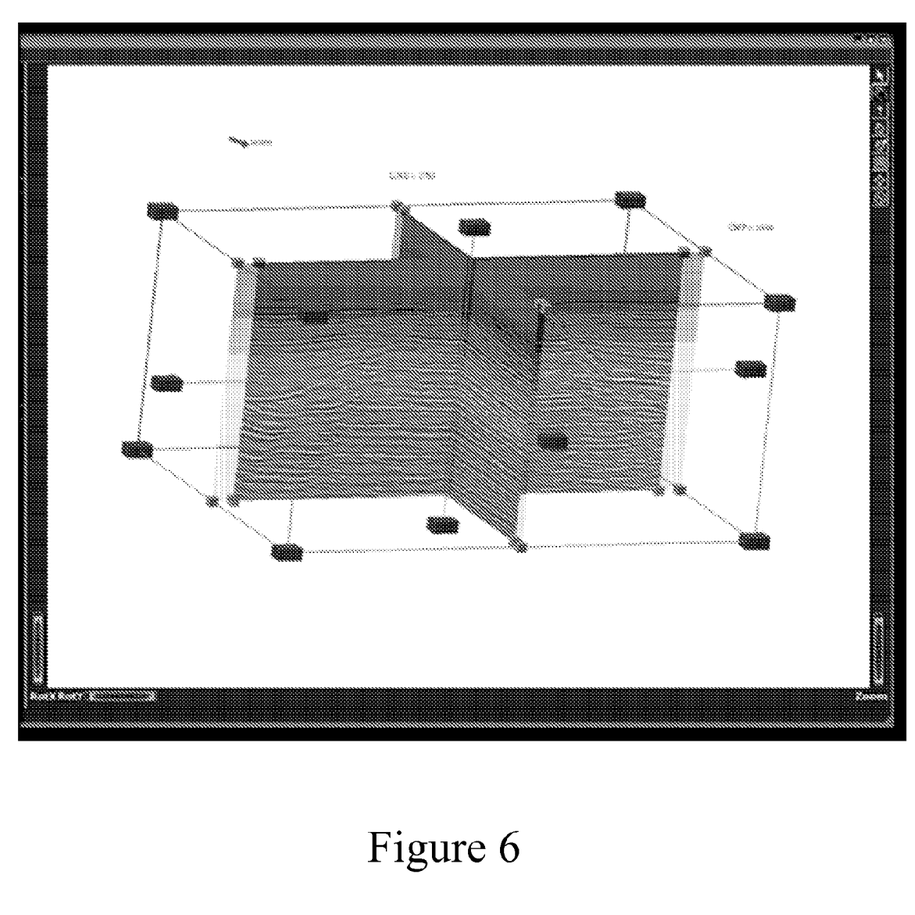
FIG. 6 illustrates two slices of a three dimensional seismic image space defining a region of interest.

Once a set of dip bars and their shifts have been selected, the process for carrying out the inversion begins by creating a three-dimensional grid that spans a space representing a velocity model for a subsurface region. As will be appreciated, it may analogously be applied to two dimensional planes as well as 3D spaces. As is illustrated in FIG. 6, graphics software is provided to position a grid over a region of an existing seismic image. By way of example, GOCAD, available from Paradigm, may be used in an embodiment. In another embodiment, Open Inventor, an open-source three dimensional graphics library may be used.

The grid may be used to store the velocity changes that result from the dip bar inversion. In this approach, each node of the grid contains an inverted velocity change at the spatial position of the node. Between nodes, velocity changes can be interpolated based on near neighbors. For example, a trilinear interpolation method may be used, though in principle other spatial interpolations (e.g., tricubic, are available. These values are viewed on a translucent color scale (represented in gray-scale in FIG. 6) and are typically superimposed on coincident gray-scale plots of the seismic image. The velocity being viewed may be the changes in velocity resulting from the dip-bar inversion or the total velocity (which is the sum of the original velocity value and the value on the grid).

A masking technique may be used to identify and/or isolate regions of velocity uncertainty within the space. In this way, the computations may be restricted by allowing velocity updates only within the regions where uncertainty is expected. The other, unmasked volumes are not updated.

Values for the mask may be stored on the same three-dimensional grid that is used to store the calculated changes resulting from the dip-bar inversion. The masked volumes may be specified in accordance with a number of embodiments, and embodiments may be combined within a single model. By way of example, the volumes may be specified as layers within an earth model, as regions near intersections of surfaces within a model, or painted with a three-dimensional brush.

Figure 7:
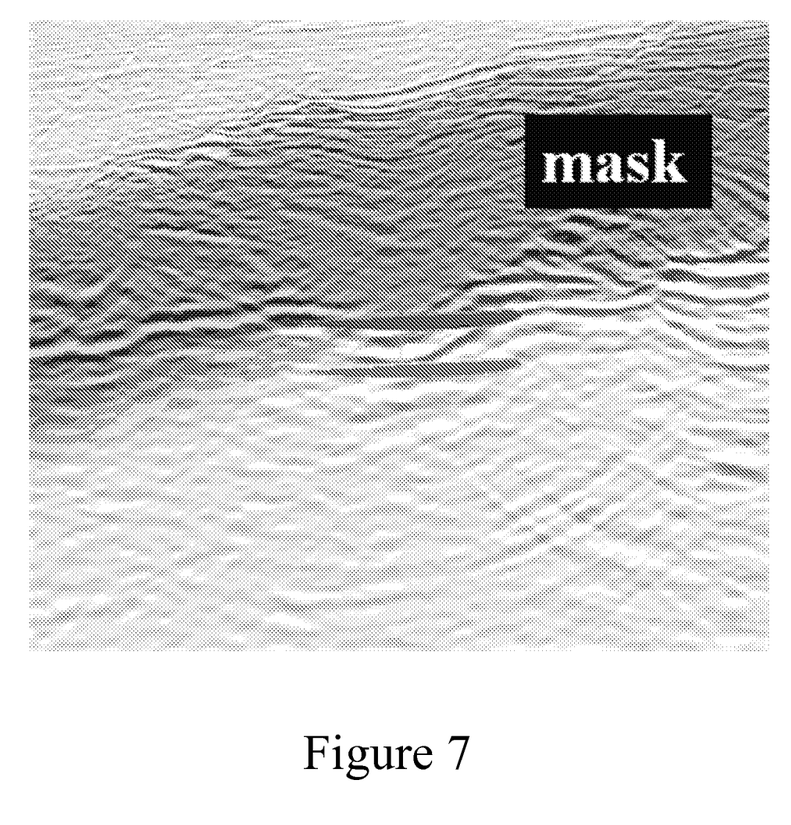
FIG. 7 is a seismic image having a masked area, shown as a dark band, for which corrections will be calculated and applied in accordance with an embodiment.

FIG. 7 shows an example of a two-dimensional slice through a masked region above a dip bar and an associated displaced dip bar and proposed shift value. A mask value of 1 (dark grey) indicates where the velocities may be changed and a value of 0 (white) indicates where the velocities may not be changed. In an embodiment, the masked region may be feathered at its edges such that there are taper regions with mask values between 0 and 1. In this region, the velocities may be changed, but the changes are constrained in accordance with systematic rules. Complex masks can be constructed from combinations of individual simple masks. For example, a grid might be masked if it is within the mask of a surface A and a surface B; or it might be masked if it is within the mask of a surface A or a surface B (which may be the disjunctive or the exclusive disjunctive).

Once the structural corrections have been delineated with dip bars and the region eligible for velocity corrections has been identified by a mask, the method proceeds by determining what velocity changes within the masked region can best produce the necessary structural corrections. These changes are automatically determined in accordance with the method by optimizing a set of equations. Specifically, for each ray there is an equation that states that the changes in velocities should shift the dip-bar for that ray by an amount needed for the new desired structure:

$$\sum_{j=1}^{M} l_{ij} \cdot \Delta s_j = S_i \cdot \Delta d_i, \quad (1)$$

where $\Delta s_j$ is the slowness change in cell j, and where slowness is defined as the reciprocal of velocity, $l_{ij}$ is the length of the ith ray in the jth cell, $S_i$ is the slowness at the location of the ith dip bar, $\Delta d_i$ is the distance for the structural correction at the ith dip bar, and M is the number of cells. Most values of $l_{ij}$ are zero because the $i^{th}$ ray does not pass through most cells. The penalty for not satisfying equation (1) is quantified as $$P_s = \frac{1}{2} \sum_{i=1}^{N} \left[ \sum_{j=1}^{M} l_{ij} \cdot \Delta s_j - S_i \cdot \Delta d_i \right]^2, \quad (2)$$

where N is the number of rays. Also, changing the slowness in regions where the mask is being tapered to zero is penalized. The penalty is:

$$P_m = \frac{1}{2} \sum_{j=1}^{M} (1 - m_j) \Delta s_j^2, \quad (3)$$

for all j, where $m_j$ is the mask value in the jth cell, and M is the number of cells in the inversion. Roughness is also penalized in the x, y, and z directions:

$$P_x = \frac{1}{2} \sum_{j=1}^{M} (\Delta s_j^{(x)} - \Delta s_j)^2$$

$$P_y = \frac{1}{2} \sum_{j=1}^{M} (\Delta s_j^{(y)} - \Delta s_j)^2 \quad (4)$$

$$P_z = \frac{1}{2} \sum_{j=1}^{M} (\Delta s_j^{(z)} - \Delta s_j)^2,$$

for all j, where $\Delta s_j^{(x)}$, $\Delta s_j^{(y)}$, and $\Delta s_j^{(z)}$ are the slowness change in the neighboring cells in the positive x, y and z directions. The total penalty is $$P = P_s + w_m P_m + w_x P_x w_z P_z, \quad (5)$$

where $w_m$, $w_x$, $w_y$, and $w_z$ are weights on the penalties for the mask and smoothness in three directions.

Finding the slowness changes that minimize P (equation 5) generates a linear system, which may be solved by a number of methods. In an embodiment, the system is solved in a hybrid L1/L2 sense using iteratively reweighted least squares.

Figure 8:
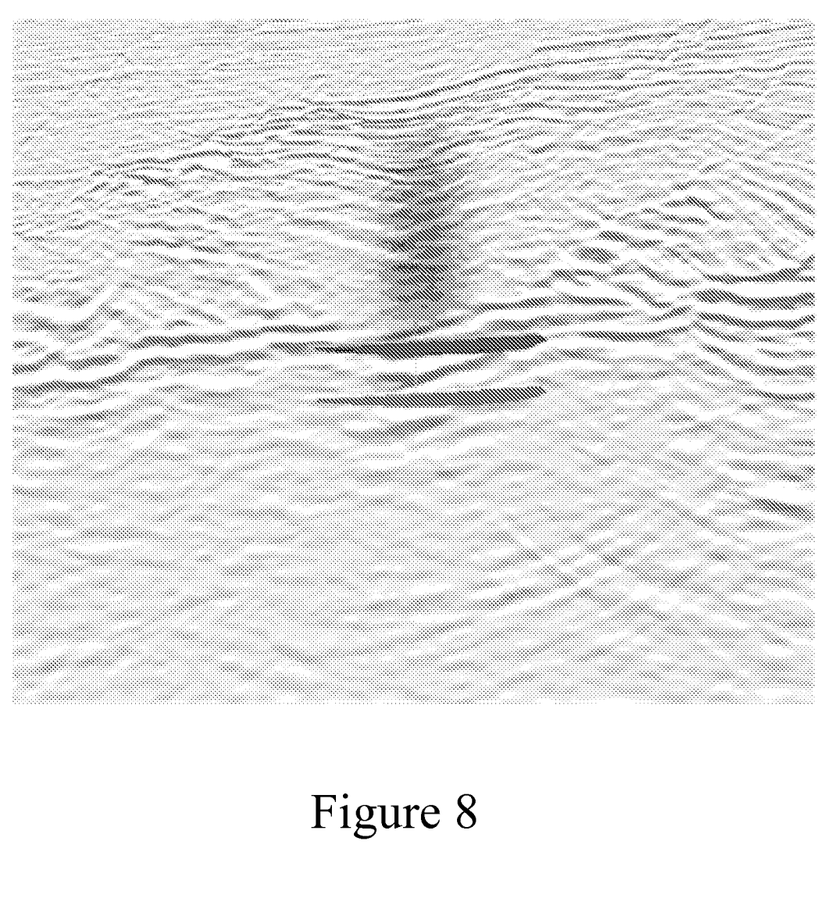
FIG. 8 illustrates a portion of the masked area, shown as a dark region, in which velocities are changed as a result of the position corrections indicated in the dip bar representation of the anomaly of FIG. 4.

FIG. 8 shows the results of an inversion for a single dip bar and mask as shown in FIG. 7. In this case, the inversion finds smooth velocity changes along the ray (indicated by the darker grey region extending above the dip bar) which would produce the depth shift indicated for the dip bar that was set as the determined structural change. As may be seen, the velocity model is altered only in the band of the mask, in this case the mask functioning to delimit a top and bottom of the velocity model changes.

In a typical case, as noted above, a number of dip bars would be necessary to indicate the determined structural changes necessary to correct an image. An example of such a situation is illustrated in FIG. 9, corresponding to a fault-shadow situation.

Figure 9:
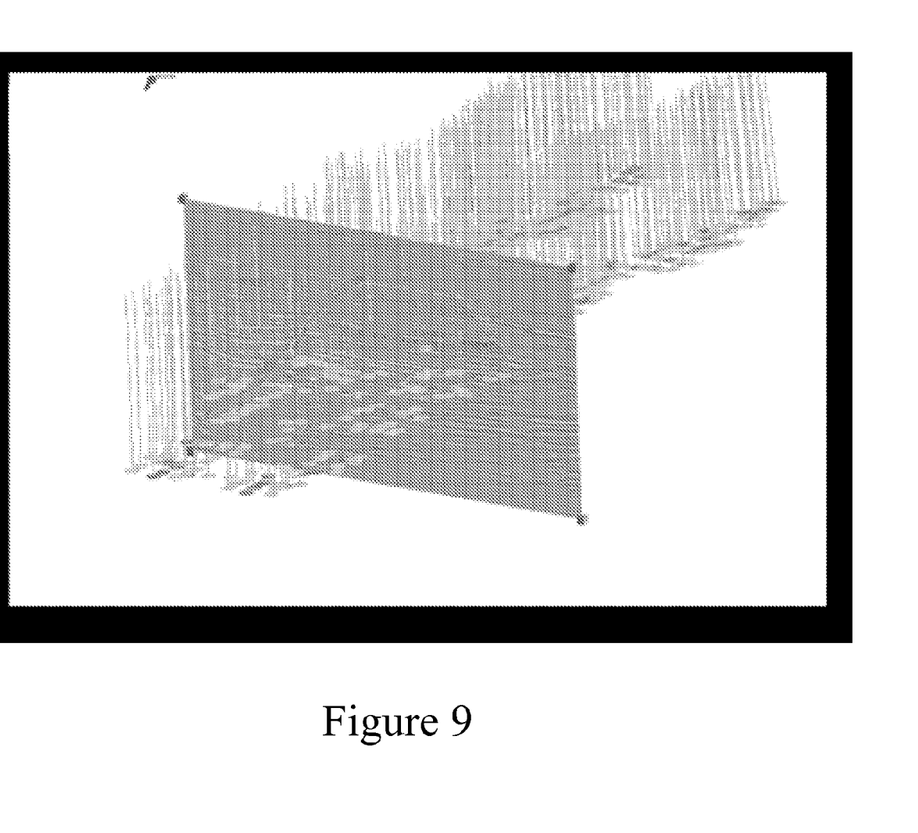
FIG. 9 illustrates a three dimensional seismic image space defining a region of interest and including a plurality of dip bars and respective position corrections selected to correct for anomalous image features in accordance with an embodiment.

For the example of FIG. 9, a set of dip bars is selected to map out the structural distortions and corrections that are interpreted to be in the fault footwalls. The interpreter also defines a mask to ensure that calculated velocity changes are applied only near the faults and in the footwalls—regions determined likely to have high uncertainty.

In accordance with the method described above, an inversion with smoothing constraints is performed to find an updated velocity model. Finally, the updated velocity model is used to compute an updated image.

Figure 10:
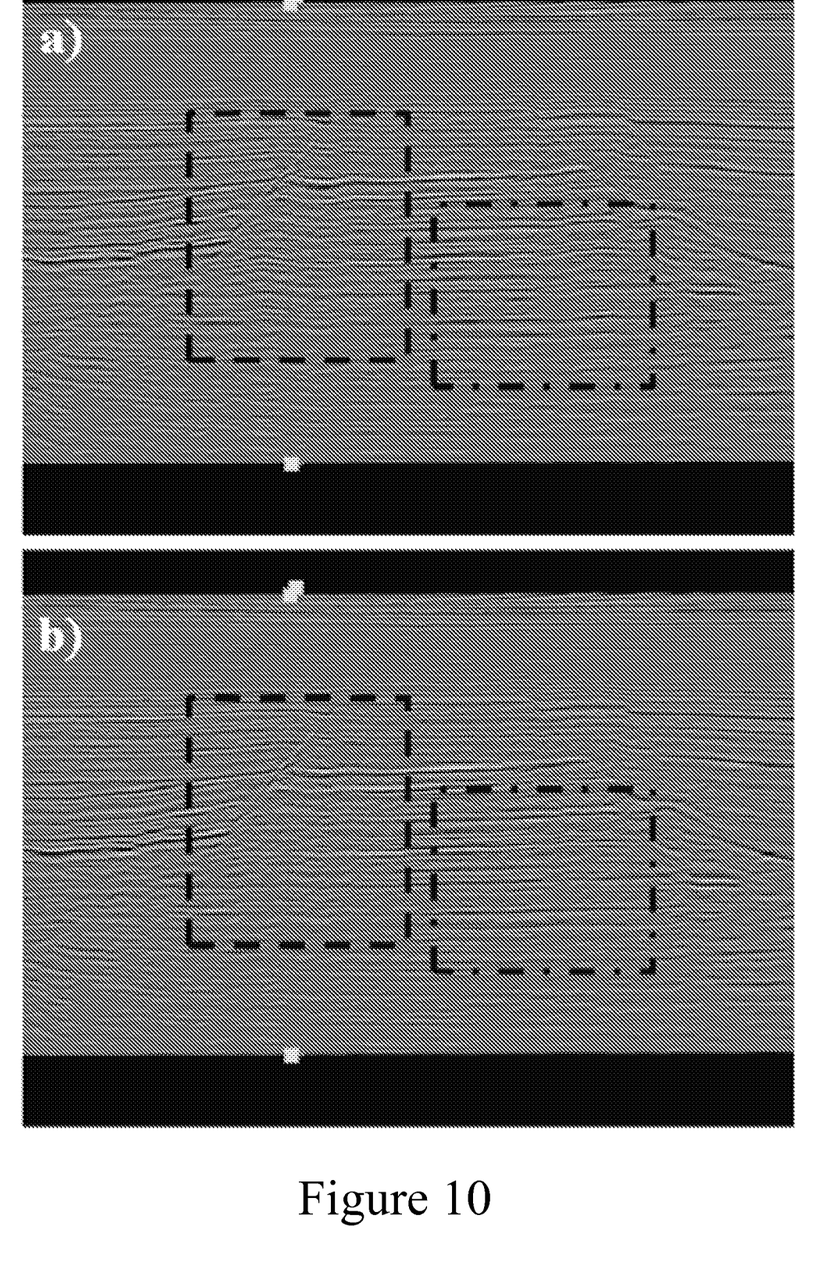
FIG. 10*a* illustrates a two dimensional portion of the region of FIG. 9 before correction.
FIG. 10*b* illustrates the same portion of the region after correction in accordance with an embodiment.

Images computed for the initial velocity model and for the updated velocity model are shown in FIGS. 10a and 10b. In the updated image, the structure in the footwall is relatively simplified, and appears more like what would be expected by the interpreter. Likewise, artifacts such as vertical streaks in amplitude are removed. The removal of such artifacts can be taken as evidence that the updated velocity model is more likely to be accurate. In an embodiment, image gathers may be inspected to determine whether events are flattened in the updated image as compared to the initial image. Improved flattening could be taken as a sign that the updated velocity model is a more accurate depiction of the subsurface structure.

Figure 11A:
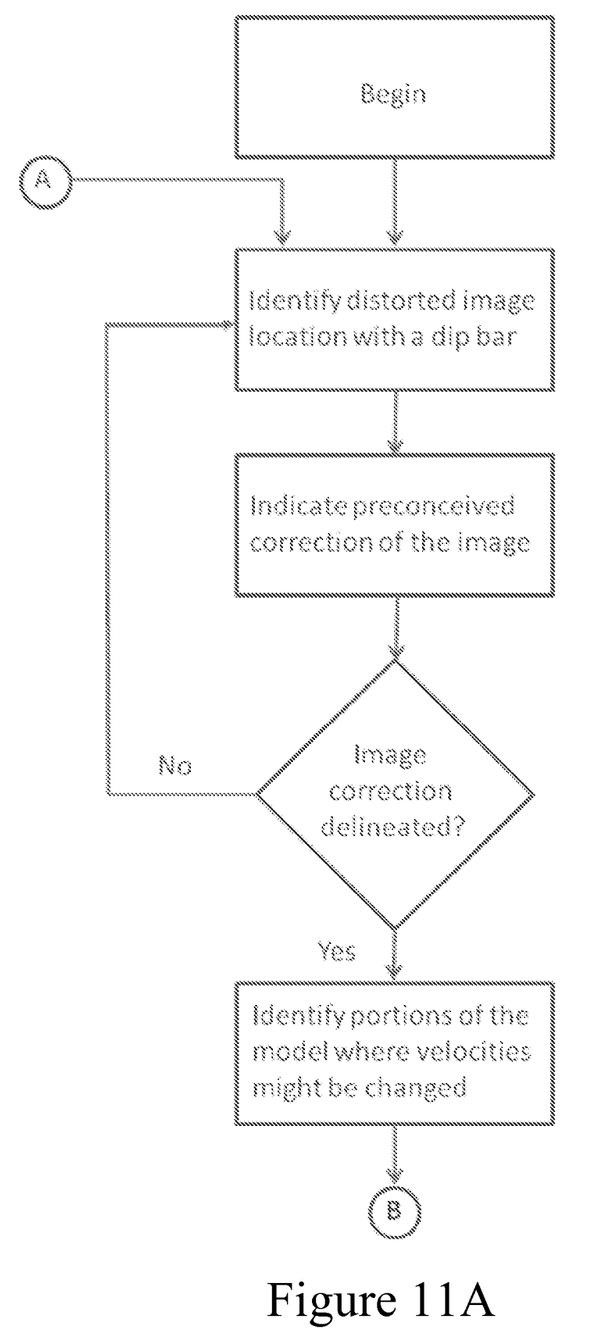
FIGS. 11*a* and 11*b* together are a flowchart illustrating an method in accordance with an embodiment.
Figure 11B:
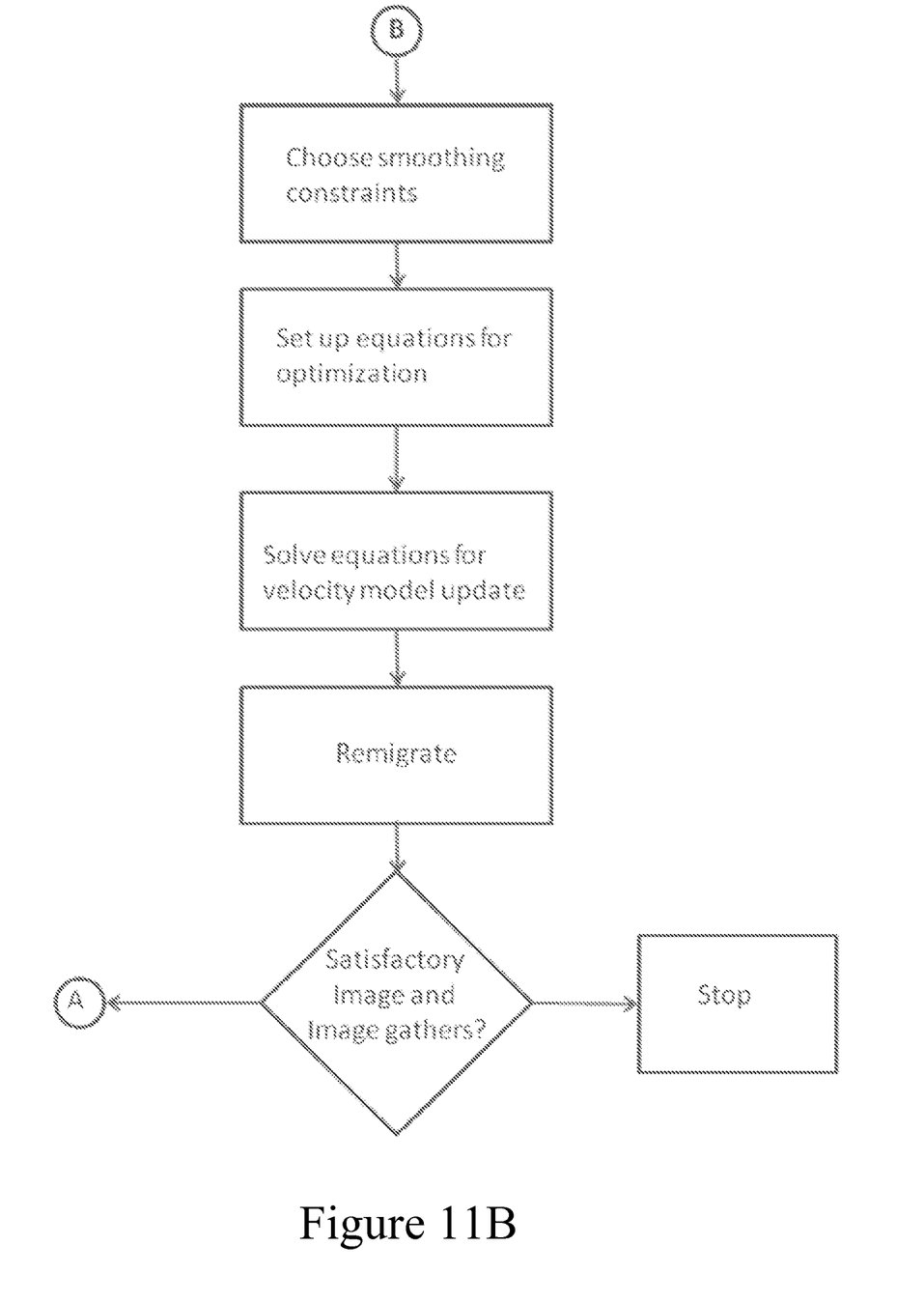

FIGS. 11a and 11b are a flowchart illustration of an inversion method in accordance with the present invention. The method begins with identification of a distorted image location by assigning a dip bar location. A correction is then added to the location. If the image correction has been delineated, then the method proceeds to identification of portions of the model where velocities might be changed (e.g., masking). If not, then additional distorted image locations are identified and corrected.

The flowchart proceeds to FIG. 11b and choosing smoothing constraints. The resulting locations, corrections, masking and smoothing constraints are applied to produce equations to be optimized. The equations are solved to produce an updated velocity model. Based on the updated velocity model, an updated image is produced by remigration. If the resulting image gathers are satisfactory, then the method is complete, otherwise, it proceeds along the path A back to identifying distorted image locations.

As will be appreciated, each step in this process may in principle require only moderate computer power. In a typical case, the interpretive step of placing the dip-bars can involve significant time and effort.

Because of the relatively low computational cost of a ray tracing approach, preliminary placements of the dip-bars can be quick tested to see if the inversion gives a reasonable velocity change. In this regard, a reasonable change can be one that produces the desired shift in dip bars, and that is also relatively smooth. As a result, the method may be retried with different sets of dip bar placements and with different smoothing constraints until an interpreter is satisfied with the result.

As will be appreciated, the method as described herein may be performed using a computing system having machine executable instructions stored on a tangible medium. The instructions are executable to perform each portion of the method, either autonomously, or with the assistance of input from an operator. In an embodiment, the system includes structures for allowing input and output of data, and a display that is configured and arranged to display the intermediate and/or final products of the process steps. A method in accordance with an embodiment may include an automated selection of a location for exploitation and/or exploratory drilling for hydrocarbon resources. Where the term processor is used, it should be understood to be applicable to multi-processor systems and/or distributed computing systems.

While the method is described primarily in terms of isotropic velocities and slowness, it should be understood that it may be employed in the context of anisotropic velocities and models thereof. By way of example, the slowness changes along the direction of the raypath may be specified by parameters for vertical transverse isotropy, such as those described by Alkhalifah and Tsvankin (1995). Additionally, the proposed method may be modified to reshape earth-model surfaces that represent geological boundaries between layers having contrasting velocities, such as surfaces that represent salt-sediment boundaries.

Those skilled in the art will appreciate that the disclosed embodiments described herein are by way of example only, and that numerous variations will exist. The invention is limited only by the claims, which encompass the embodiments described herein as well as variants apparent to those skilled in the art. In addition, it should be appreciated that structural features or method steps shown or described in any one embodiment herein can be used in other embodiments as well.

We claim:

1. A method of modifying a seismic image of a subsurface region comprising:
    identifying a plurality of locations within the seismic image that include an anomalous feature, comprising locating a dip bar at each location within the plurality of locations;
    indicating a plurality of structural changes associated with the anomalous feature, the structural changes selected to at least partially correct for the anomalous feature, comprising indicating a position correction of each dip bar within the seismic image as a shift along a normal ray;
    identifying a region causing the anomalous feature in which corrections to a velocity model corresponding to the seismic image are to be applied;
    performing an inversion for the region in accordance with the indicated structural changes to determine changes in slowness for the region wherein the inversion comprises a simultaneous inversion along a plurality of rays normal to the dip bars and;
    updating the velocity model based on the changes in slowness; and
    producing a modified seismic image on the basis of the updated velocity model.

2. A method as recited in claim 1, wherein the region is identified in accordance with a determination of a high likelihood of velocity uncertainty.

3. A method as in claim 2, wherein the identifying a region comprises presenting an image of the subsurface region in a graphical user interface and selecting, using the graphical user interface, a portion of the subsurface region.

4. A method as in claim 3, wherein the selecting comprises defining a masked volume.

5. A method as in claim 4, wherein the defining the masked volume comprises painting the masked volume with a three-dimensional brush.

6. A method as recited in claim 1, wherein the producing a modified seismic image comprises a beam migration.

7. A method as recited in claim 1, wherein changes in velocities in the velocity model are determined by optimizing a set of equations wherein for each normal ray, the change in velocity shifts the structure in accordance with the indicated structural changes such that $$\sum_{j=1}^{n} l_{ij} \cdot \Delta s_j = S_i \cdot \Delta d_i \quad (1)$$

where $\Delta s_j$ is the slowness change in a jth cell, $l_{ij}$ is the length of the normal ray originating at an ith identified location in the jth cell, $S_i$ is a slowness at the ith identified location, and $\Delta d_i$ is a distance for the structural change at the ith identified location and wherein the simultaneous inversion along a plurality of rays normal to the dip bars minimizes the penalty $$P_s = \frac{1}{2} \sum_{i=1}^{N} \left[ \sum_{j=1}^{n} l_{ij} \cdot \Delta s_j - S_i \cdot \Delta d_i \right]^2.$$

8. A method as in claim 1, further comprising:
    examining the modified image to determine whether the anomalous feature is corrected;
    and, for an uncorrected feature, iterating the identifying a plurality of locations, the indicating a plurality of structural changes, the identifying a region, the performing an inversion, the updating the velocity model and the producing a modified seismic image until the anomalous feature is corrected.

9. A method as in claim 1, further comprising selecting constraints on changes in velocities in the velocity model wherein the inversion is performed in accordance with the selected constraints.

10. A system for modifying a seismic image of a subsurface region comprising:
    a computing system, the computing system comprising:
    a graphical user interface;
    a data storage device; and
    a processor, the processor being in operative communication with the graphical user interface and the data storage device and being configured and arranged to execute computer executable instructions for performing a method comprising:
        identifying a plurality of locations within the seismic image that include an anomalous feature, comprising locating a dip bar at each location within the plurality of locations;
        indicating a plurality of structural changes associated with the anomalous feature, the structural changes selected to at least partially correct for the anomalous feature, comprising indicating a position correction of each dip bar within the seismic image as a shift along a normal ray;
        identifying a region causing the anomalous feature in which corrections to a velocity model corresponding to the seismic image are to be applied;
        performing an inversion for the region in accordance with the indicated structural changes to determine changes in slowness for the region wherein the inversion comprises a simultaneous inversion along a plurality of rays normal to the dip bars and;
updating the velocity model based on the changes in slowness; and
producing a modified seismic image on the basis of the updated velocity model.

11. A system as in claim 10, wherein the identifying a plurality of locations, indicating a plurality of structural changes and identifying a region are performed using the graphical user interface.

* * * * *